United States Patent [19]

Kerrey et al.

[11] Patent Number: 4,522,330
[45] Date of Patent: Jun. 11, 1985

[54] GRID AND SLEEVES WELDING FIXTURE AND METHOD

[75] Inventors: John S. Kerrey; Robert Duncan, both of Columbia, S.C.

[73] Assignee: Westinghouse Electric Corp., Pittsburgh, Pa.

[21] Appl. No.: 414,203

[22] Filed: Sep. 1, 1982

[51] Int. Cl.³ .............................................. B23K 37/04
[52] U.S. Cl. .................................. 228/182; 228/183; 269/309
[58] Field of Search ..................... 228/49 R, 182, 183, 228/212; 29/160, 281.1, 281.4, 281.5, 464, 467, 559; 269/37, 45, 47, 54.5, 309, 296; 165/162

[56] References Cited

U.S. PATENT DOCUMENTS

| | | | |
|---|---|---|---|
| 3,423,287 | 1/1969 | Anthony et al. | 165/162 X |
| 3,442,763 | 5/1969 | Chetter et al. | 165/162 X |
| 3,606,300 | 9/1971 | Davis | 269/309 X |
| 3,844,887 | 10/1974 | Georges et al. | 165/162 X |
| 4,007,899 | 2/1977 | Piepers et al. | 165/162 X |
| 4,010,796 | 3/1977 | Scholtus | 165/162 X |
| 4,027,868 | 6/1977 | Jolly | 269/309 X |
| 4,090,918 | 5/1978 | Masetti | 165/162 X |
| 4,101,752 | 7/1978 | Duncan | 219/91.2 |
| 4,192,055 | 3/1980 | Moore | 269/45 |

Primary Examiner—Kenneth J. Ramsey
Assistant Examiner—M. Jordan
Attorney, Agent, or Firm—D. E. Erickson

[57] ABSTRACT

A welding fixture for use in welding sleeves to a grid includes a plate having a pair of spaced pins with bushings for both locating the grid and positioning a sleeve, and abutment members; and a plurality of sleeve locating positioning pegs. A method of positioning a grid and sleeves for welding sleeves to the grid.

10 Claims, 12 Drawing Figures

GRID AND SLEEVES WELDING FIXTURE AND METHOD

CROSS-REFERENCE TO COPENDING APPLICATIONS

Attention is drawn to the following copending, commonly assigned applications, all/each filed on even date and incorporated specifically by reference into the instant specification:

(1) "FUEL GRID WITH SLEEVES WELDED IN NOTCHED GRID STRAPS" (Westinghouse Case No. 49,420), by R. Duncan, Ser. No. 414,232;

(2) "PULSED LASER MACHINING APPARATUS" (Westinghouse Case No. 49,422), by R. A. Miller and G. D. Bucher, Ser. No. 414,264;

(3) "APPARATUS AND METHOD FOR LASER MACHINING IN NON-REACTIVE ENVIRONMENT" (Westinghouse Case No. 49,720), by R. A. Miller and G. G. Lessman, Ser. No. 414,242;

(4) "STRAP AND VANE POSITIONING FIXTURE FOR FUEL ROD GRID AND METHOD" (Westinghouse Case No. 49,721), By R. F. Antol, R. W. Kalkbrenner and R. M. Kobuck, Ser. No. 414,197;

(5) "GRID ASSEMBLY FIXTURE, RETENTION STRAP AND METHOD" (Westinghouse Case No. 49,722), By R. M. Kobuck and R. W. Kalkbrenner, Ser. No. 414,198;

(6) "LASER MACHINING SYSTEM" (Westinghouse Case No. 49,723), by D. L. Wolfe, J. W. Clements and J. S. Kerrey, Ser. No. 414,241;

(7) "MOVABLE MACHINING CHAMBER WITH ROTATABLE WORK PIECE FIXTURE" (Westinghouse Case No. 49,938), By R. F. Antol, R. Kalkbrenner and D. L. Wolfe, Ser. No. 414,263;

(8) "WORKPIECE GRIPPING AND MANIPULATING APPARATUS FOR LASER WELDING SYSTEMS AND THE LIKE" (Westinghouse Case No. 49,961), by R. Kalkbrenner and R. Kobuck, Ser. No. 414,262;

(9) "LASER LENS AND LIGHT ASSEMBLY" (Westinghouse Case No. 50,106), by R. Antol, R. Kalkbrenner and R. Kobuck, Ser. No. 414,205;

(10) "WELDING PLATES FOR A FUEL ROD GRID" (Westinghouse Case No. 50,107), by R. M. Kobuck, R. Miller, R. W. Kalkbrenner, J. Kerrey and R. Duncan, Ser. No. 414,265;

(11) "PLURAL COMPUTER CONTROL FOR SHARED LASER MACHINING" (Westinghouse Case No. 50,288), By J. W. Clements and W. D. Lanyi, Ser. No. 414,204;

(12) "CALIBRATION OF AUTOMATED LASER MACHINING APPARATUS" (Westinghouse Case No. 50,529) by J. W. Clements and J. R. Faulkner, Ser. No. 414,272; and

(13) "RIGID SUPPORT FOR LASER MACHINING APPARATUS" (Westinghouse Case No. 50,530), by D. L. Wolfe, Ser. No. 414,191.

BACKGROUND OF THE INVENTION

Description of the Prior Art

This invention, in its preferred form, relates to welding fixture for welding sleeves to a fuel grid and to a method for assembling and locating the sleeves relative to the grid. More particularly, the invention relates to the apparatus, and the attendant method, for locating a grid on a fixture, and for locating sleeves on the grid, through use of the fixture. As herein used, the word "fixture" includes both a plate having abutments and locating pins, and independent pegs.

There have been provided nuclear fuel bundle assemblies which include a matrix of nuclear fuel rods which are arrayed in rows and columns and held in such configuration by a plurality of fuel rod grids. These grids are formed of straps which are slotted so that the straps mate, one strap entering into the slot of the outer strap at each point of intersection. Control rods are included at selected positions within the array of nuclear fuel rods. These control rods are received in guide sleeves which are welded to the grid. More particularly, there has been provided in the past a construction in which the straps forming the grid had edges which were substantially in a common plane, and a plurality of guide sleeves were provided, each seated on four straps defining a common cell. The outside diameter of the cylindrical guide sleeve was such as to permit the base of the cylindrical guide sleeve to rest upon the edges of four straps forming a single cell, it being understood that guide sleeves were provided only at spaced cells, and not at adjacent cells.

To assemble the guide sleeve to the grid, the guide sleeves were butt welded onto the straps forming the particular cell at the upper edge of each of the four straps. This procedure required that the grid, after assembly, be machined to insure that the edges of the four straps forming the particular cell to which the cylindrical sleeve was to be welded lay as closely as possible in a common plane, and this required a fabrication step known as "spot facing". The "spot facing" step was time consuming and costly, requiring the use of a suitable machine and fixtures, as well as the expenditure of a workman's time. The requirement for relatively great precision in the location of the strap edges is based on the fact that if a gap greater than 0.005 inches remains between the sleeve and the edge of the grid strap, the weld which is effected may well be defective in that the fused metal will not extend entirely beneath that portion of the base of the cylindrical sleeve which is intended to engage the upper edge of the grip strap; the occurrence of a gap will result in either lack of welding or no welding, either of which is unsatisfactory.

Welding fixtures and methods have been heretofore provided, involving the provision of so called "chills" generally in the nature of pins which extended into cells and which positioned sleeves on the grid, for welding. These fixtures have not proven satisfactory, particularly in connection with the utilization of laser welding for welding the sleeves to the grid straps.

SUMMARY OF THE INVENTION

It is therefore an object of this invention to provide welding fixture apparatus and related method which will enable the accurate positioning of the grid on a support plate, the support plate having thereon positioning features for cooperation with a support structure, so that the grid will be located with suitable precision relative to the support fixture, and therefore to the laser beam.

It is a further more specific object to provide welding fixture apparatus and related method for locating with suitable precision sleeves to be joined to the straps of a grid.

It is a still further object to provide welding fixture and related method which will locate with suitable precision both a grid and sleeve, relative to a support plate and the positioning means thereon, for accurate location of the sleeves for welding them to the straps of the grid.

Yet another object is to provide a welding fixture and related method which permit ease of separation of the grid and welded sleeves from the fixture.

In accordance with these and other objects of the invention, there is disclosed a welding fixture including a plate having positioning means thereon for cooperating with a support for supporting the plate, grid, and sleeves in position for welding. The plate is approximately square, in preferred form, having generally triangular protrusions extending therefrom, with beveled positioning surfaces on the protrusions, and holes with bushings therein in the protrusions. The plate is provided with abutments extending from one surface thereof, to be engaged by a side of the grid, to thereby support the grid in relatively precise location above the plate. The plate is also provided with a pair of grid locating pins, each preferably adjacent an opposite corner of the plate. Each grid locating pin has a large diameter portion adjacent the plate, extending a sufficient distance above the plate so as to enter into a cell of the grid, and to engage the four straps forming the cell. The grid locating pin has a small diameter portion extending from the large diameter portion, and connected thereto by a beveled transition portion, the small diameter portion extending in the cell, and having a length sufficient to enable it to extend beyond the grid. A cylindrical bushing has an outer diameter substantially equal to the diameter of the grid locating pin large diameter portion, and an internal diameter substantially equal to the small diameter portion of the locating pin. The cylindrical bushing has a beveled end, for mating engagement with the beveled transition portion of the locating pin. As a part of the welding fixture, there are provided, in addition, a plurality of pegs, having enlarged heads, the diameter of the peg being substantially the same as the internal diameter of the sleeves, and as the outer diameter of the cylindrical bushing, so that the peg may have mating and positioning engagement with the sleeve and a cell of the grid.

The above apparatus is used in connection with a grid and sleeves as follows. The grid is placed on the two grid locating pins, so that they extend through cells of the grid. The grid is caused to engage the abutments, and then the cylindrical bushings are placed on the small diameter portions of the grid locating pins. This thereby locates the grid with suitable precision relative to the positioning means of the plate, these being the holes and bushings in the protrusions. Sleeves are positioned on the cylindrical bushings on the locating pins so that they engage the four straps forming the cell of the grid in which the locating pin extends. This serves to establish each sleeve in alignment with the cell of the grid with which it is associated, i.e., so that the axis of the sleeve is in alignment with the axis of the cell of the grid. The pegs are inserted through additional sleeves, and extend into selected cells, so that the pegs matingly engage both the sleeves and the cells, thereby holding these sleeves, also, in the same relationship to the cells.

BRIEF DESCRIPTION OF THE DRAWINGS

A detailed description of the preferred embodiment of this invention is hereafter made with specific reference being made to the drawings in which.

DESCRIPTION OF THE PREFERRED EMBODIMENT

Figure 1:
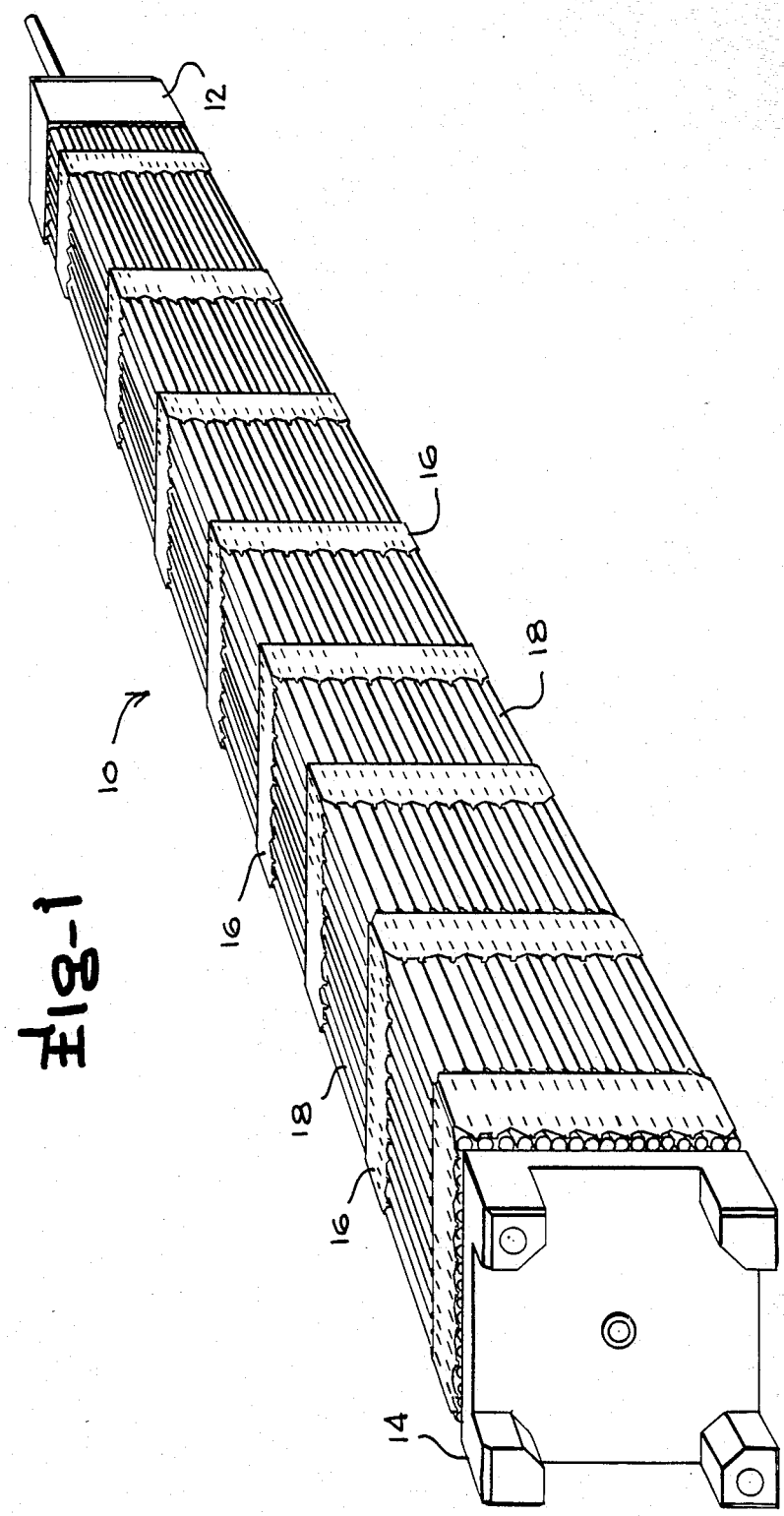
FIG. 1 is a perspective view of a nuclear fuel bundle assembly.

The apparatus and method of this invention are specifically designed as part of the manufacture of nuclear fuel bundle assemblies 10 as shown in FIG. 1 of the drawings. As shown, the nuclear fuel bundle assembly 10 is a self-contained unit comprised of a top nozzle assembly 12 and a bottom nozzle assembly 14, between which is disposed a matrix of nuclear fuel rods 18 arrayed in rows and columns and held in such configuration by a plurality of fuel rod grids 16. Though not shown in FIG. 1, control rods are included at selected positions within the array of nuclear fuel rods 18. The assemblies 12 and 14 and the fuel rod grids 16 provide a skeletal frame to support the fuel rods 18 and the control rods. The nuclear fuel bundle assemblies 10 are loaded into predetermined locations within a nuclear reactor and therefore, the orientation of the fuel rods 18 with respect to each other is rigorously controlled.

Figure 2:
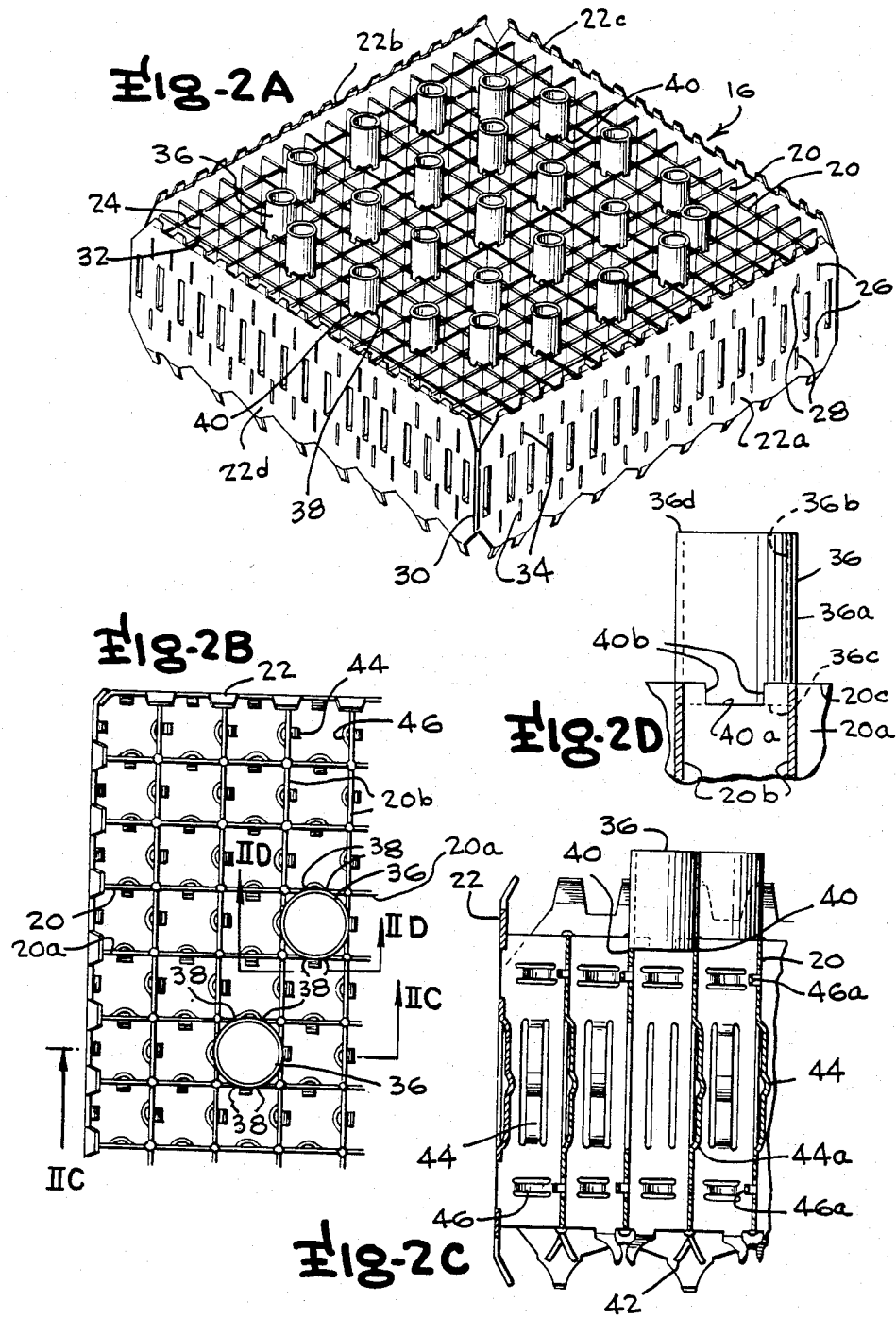
FIG. 2A is a perspective view of a grid, with sleeves thereon.
FIG. 2B is a plan view, showing a portion of the grid and several sleeves on an enlarged scale.
FIG. 2C is a cross-sectional view taken on the line 2C—2C of FIG. 2B.
FIG. 2D is a cross-sectional view taken along the line 2D—2D of FIG. 2B.

The present invention is, in one illustrative embodiment thereof, related to the manufacture of fuel rod grids 16 as shown in FIG. 2A. The fuel rod grid 16 is of an approximately square configuration whose periphery is formed by four outer grid straps 22a, 22b, 22c, and 22d. Each end of an outer grid strap 22 is welded by a corner seam weld 30 to the end of a perpendicularly disposed outer grid strap. Two sets of spaced, parallel inner grid straps 20 are provided, the straps of the sets being perpendicular to each other, whereby a plurality of square cells are formed to receive the control rods and the nuclear fuel rods 18. The inner grid straps 20 have mating slots therein providing points 24 of intersection. An intersect weld 32 is formed at each of the points 24 of intersection, whereby a rigid grid structure is formed. Further, each of the inner grid straps 20 includes at each end a pair of tabs 26 of a size and configuration to be tightly received in top and bottom slots 28 formed in the outer grid straps 22, as shown in FIG. 2A. A slot and tab weld 34 is effected along the top and bottom rows of slots 28 in the outer grid straps 22. Further, a plurality of guide sleeves 36 are disposed on the top-most surface of the fuel rod grid 16 to receive and guide the control rods disposed therein. A series of seam welds 38 securely attach the guide sleeves 36 to corresponding notches 40 formed within the inner grid straps 20. A precision laser welding apparatus is particularly adapted to perform a series of controlled welding operations whereby each of the welds 30, 32, 34, and 38 is carried out. The precision laser welding apparatus as described and claimed in Westinghouse Case 49723 and 49938 not only controls the various parameters of generating the laser in terms of the pulse width and pulse height of each laser pulse and the number of pulses to be applied to each weld, but also controls the sequential positioning of the fuel rod grids 16 with respect to the laser beam. It is understood that after each such weld, the fuel rod grid 16 is repositioned and/or the focal point of the laser beam changed to effect the particular type of weld desired.

FIG. 2B discloses a portion of the grid 16, showing two of the sleeves 36 joined to certain of the inner grid straps 20. FIG. 2C shows that there are provided, in each of the cells formed by four intersecting straps, resilient fingers 44 which have been stamped from the material of the straps during the operation which has formed the straps from a continuous strip of metal. In addition, there are provided, at the bottom of the grid 16 as shown in FIG. 2C, vanes 42 which extend from the various straps 20 and 22 and which lie at angles to the planes containing the straps from which they extend. Also provided are resilient spacing fingers 46.

In FIG. 2D there is shown, in detail, the specific grid and sleeve assembly which results from the present invention. The sleeve 36 is a right cylinder, having an outer cylindrical surface 36a, a concentric inner cylindrical surface 36b, and annular end faces 36c and 36d. A portion of an inner strap 20a is shown in elevation, and closely perpendicular thereto, and in spaced, closely parallel array are a pair of grid straps 20b, which are shown in cross section. As shown in FIG. 2B, the sets of parallel grid straps, which are uniformly spaced and in which the straps of one set are perpendicular to the straps of the other set, form a plurality of cells. Since the spacing of the straps are uniform, the cells are squares. Further, as shown in FIG. 2C, the upper edges of all of the straps lie substantially in a common plane.

Each of the straps 20a, 20b forming a cell with which a sleeve 36 is to be joined is provided with a rectangular notch 40 which is located centrally along the edge of the strap 20a as shown in FIG. 2D which is between the two straps 20b. The notch 40 comprises an edge 40a which is parallel to and spaced from the edge 20c of strap 20a, and the notch 40 is also formed by a pair of edges 40b which are perpendicular to the edges 40a and 20c and which define the lateral extent of the notch. Each of the edges 40b is equidistant from the straps 20b.

A substantially identical notch 40 is provided in the edges of the four straps forming the cell, above which is the sleeve 36 shown in FIG. 2D. Thus, the cylindrical sleeve 36 is in said four rectangular notches 40 in said four straps, and substantially engages the four straps. More particularly, the outside diameter of the sleeve 36 is slightly greater than the distance between the non-facing surfaces of the straps 20b, which is the outside surfaces of the straps as shown in FIG. 2D. As a consequence, the sleeve 36 has an interference fit with the straps 20a and 20b at the notches 40 thereof. The cylindrical sleeve 36 has substantial engagement with each of the edges 40a and 40b of each of the notches, and thus the lower face 36c of the cylindrical sleeve 36 seats upon the four edges 40a of the four notches.

The sleeve 36, once positioned as shown in FIG. 2D, is welded by a weld 38 which is effected at the edges 40b of a pair of opposite straps 20a, as shown in FIG. 2B. The welding of the four edges of the two opposite straps is usually sufficient to provide a suitable, strong weld. This weld is accomplished through laser welding techniques.

Figure 3:
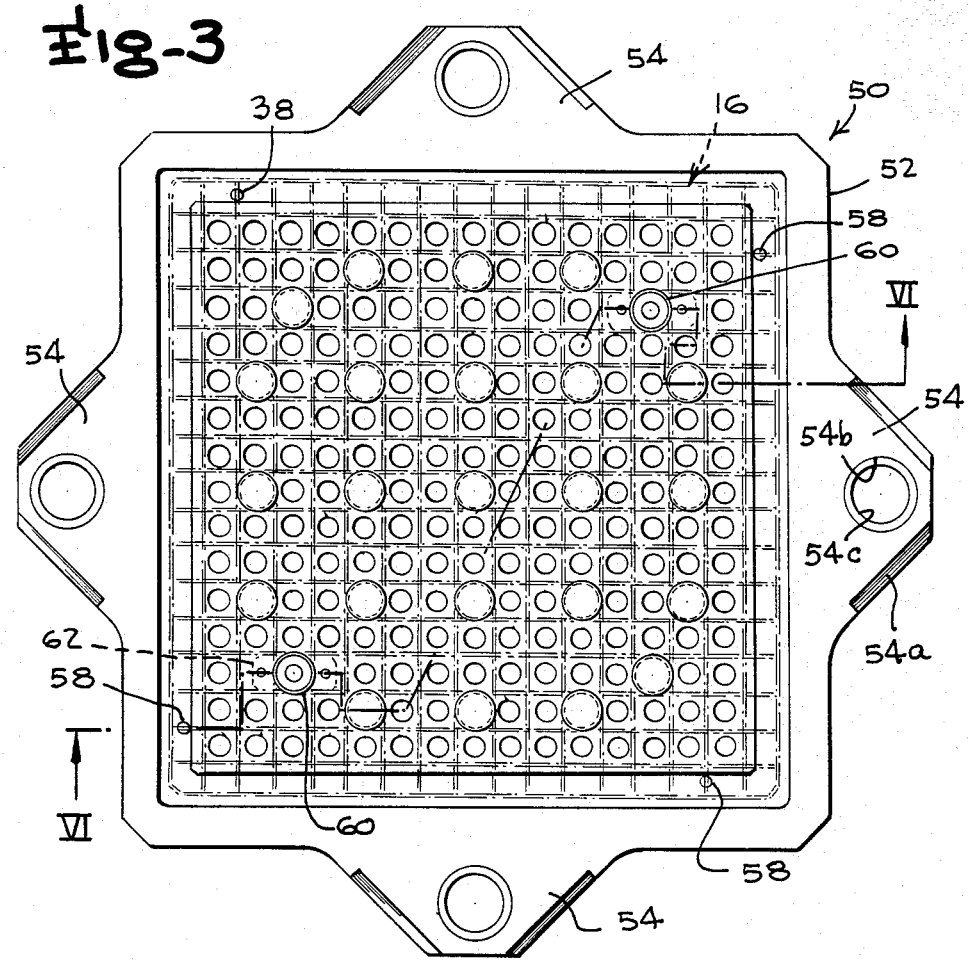
FIG. 3 is a plan view of a welding fixture with a grid and sleeves thereon.

In FIG. 3, there is a plan view of a welding fixture 50 which comprises a plate 52 of generally square configuration, and having triangular protrusions 54 at each side thereof. Each protrusion 54 is provided with beveled edges 54a and a precisely located opening 54b, in which is a bushing 54c. The bushing 54c in each of the protrusions 54 serves to relatively precisely position the plate 52 in relation to a laser beam, for welding operations to be hereinafter set forth. Positioned on the plate 52 is a grid 16 (see FIG. 2A) with sleeves thereon.

Figure 4:
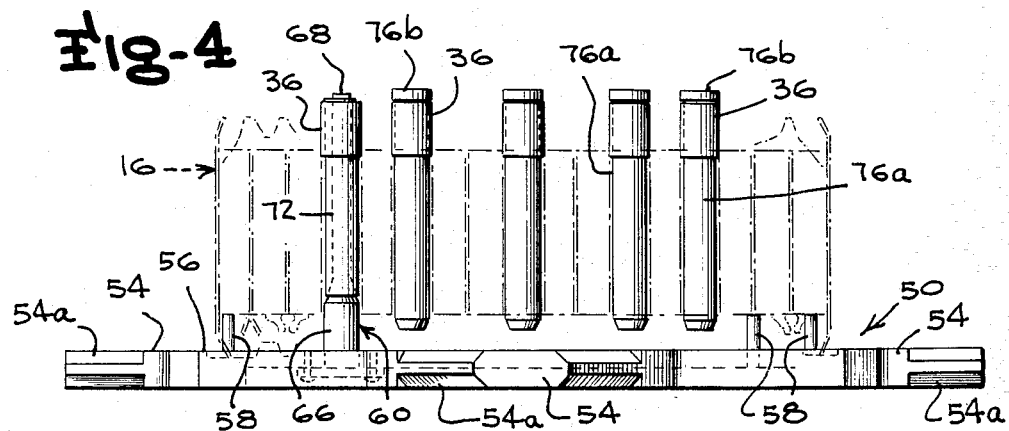
FIG. 4 is an elevational view of the welding fixture of FIG. 3, showing the sleeves, and showing the grid in phantom lines.

In FIG. 4, the grid 16 is shown in phantom lines, there also being shown the welding fixture 50 and the protrusions 54 with beveled edges 54a. From the upper surface 56 of the plate 52, there extend a plurality of abutment members 58, having their upper, free ends substantially in a common plane, and positioned to engage the underside of the grid 16, and thereby support the grid at a predetermined distance above the surface 56.

Grid locating pins 60 are provided, extending upwardly from the surface 56, and as will be seen from FIG. 3, the pair of grid locating pins 60 are positioned at a substantial distance from each other on the plate 52. In particular, each of the grid locating pins 60 is adjacent a corner of the plate 52, and the pins 60 are located adjacent opposite corners of plate 52.

Figure 6:
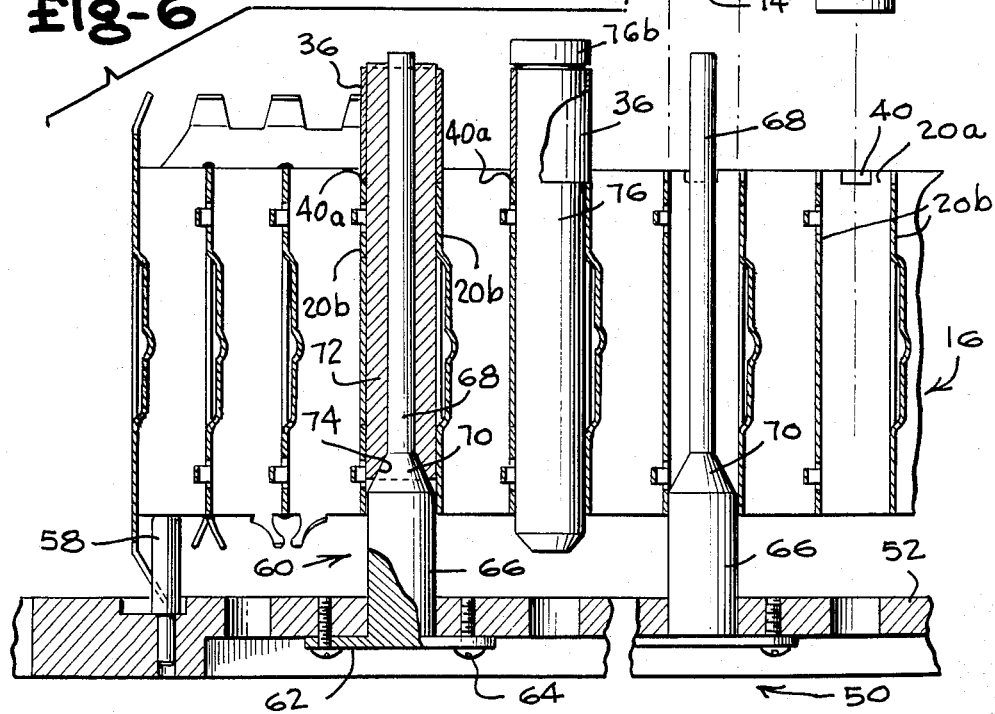
FIG. 6 is a cross-sectional view taken on the line VI—VI of FIG. 3.

As best shown in FIG. 6, each of the grid locating pins 60 at its lower end has a head 62 by which it is secured, by means of screws 64, to the plate 52. Pin 60 comprises a lower, large diameter portion 66 adjacent the plate 52, and an upper, small diameter portion 68 extending axially of large diameter portion 66; a beveled transition portion 70 connects the large diameter portion 66 and the small diameter portion 68. The small diameter portion 68 will be seen to extend substantially above the common plane which contains the upper edges of the inner grid straps 20a and 20b. As shown particularly in FIG. 6, the large diameter portion 66 extends above the end of abutment number 58, and thereby enters into a cell formed by four of the inner straps 20a, 20b, and engages each of the straps of that cell. As will be understood, the diameter of the large diameter portion 66 is substantially the same as the distance across a cell, between the opposing faces of the straps forming the cell.

In FIG. 6, at the upper right side, there is shown a cylindrical bushing 72 having an external diameter which is substantially the same as the diameter of the large diameter portion 66 of the grid locating pin 60. The inner diameter of cylindrical bushing 72 is substantially the same as the diameter of the small diameter portion 68 of grid locating pin 60. Further, cylindrical bushing 72 has a lower, beveled end 74 which is complimentary to the beveled transition portion 70. Consequently, the cylindrical bushing 72 may be placed on the small diameter portion 68 of grid locating pin 60, with the beveled end 74 thereof in mating engagement with the beveled transition portion 70. Thus, the cylindrical bushing 72 matingly engages the small diameter portion 68 of grid locating pin 60 and the straps of a cell.

A plurality of positioning pegs 76 form a part of welding fixture 50, and each comprises a cylindrical portion 76a of substantially the same diameter as the large diameter portion 66 of grid locating pin 60, and a somewhat larger head 76b of larger diameter.

At the upper right side of FIG. 6, there is shown a sleeve 36, above the cylindrical bushing 72, and it will be seen that the inner diameter of the sleeve 36 is substantially equal to the outer diameter of the cylindrical bushing 72. Thus, as shown at the left of FIG. 6, the sleeve 36 may be positioned on the cylindrical bushing 72, the grid locating pin 60 and the cylindrical bushing 72 cooperating to position or locate the sleeve 36 so that its axis is coincident with the axis of the cell in which the grid locating pin 60 is positioned.

At the upper right side of FIG. 6, and below the positioning peg 76, is a sleeve 36, and it will be seen that the diameter of the cylindrical portion 76a of positioning peg 76 is substantially the same as the inner diameter of sleeve 36. At the left portion of FIG. 6, there will be seen a positioning peg 76 located in a cell, and engaging the facing surfaces of the four straps forming the cell, with the sleeve 36 thereabove, the head 76b engaging the end of sleeve 36.

Figure 5:
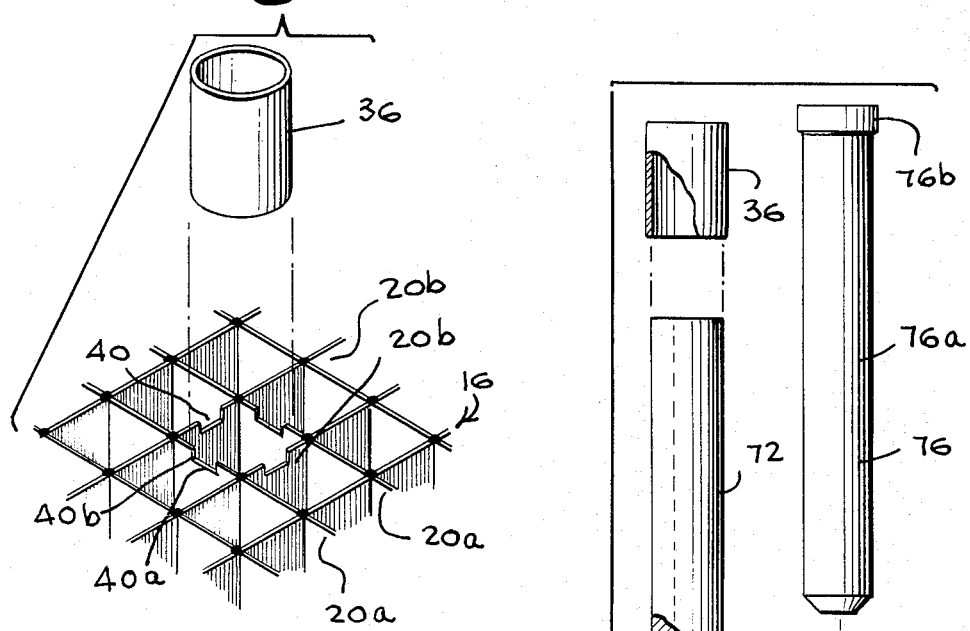
FIG. 5 is a perspective view showing a sleeve and a part of the grid shown in FIG. 3.

In FIG. 5, there is shown an exploded view of a sleeve 36 and a portion of the grid 16, comprised of the set of parallel straps 20a and the perpendicular set of straps 20b. A cell formed by four such straps is provided at the upper edges of the straps with rectangular notches having lower edges 40a and perpendicular edges 40b as hereinabove described. The sleeve 36 will seat on the straps, and in particular in the notches, as hereinabove described. This is observed in FIG. 6, where the lower end of the sleeve 36 will be seen to be below the upper edges of the straps, and is seated upon the edge 40a of straps 20b.

The abutment members 58 will locate the grid 16 at a predetermined distance above the upper surface 56 of the plate 52. The two grid locating pins 60 will enter into substantially spaced cells of the grid 16, and due to the engagement of the large diameter portions 66 thereof, will serve to precisely locate the grid 16 relative to the plate 52, and in particular to the bushings 54c. Consequently, grid 16 is precisely located relative to the positioning elements of plate 52.

The cylindrical bushings 72 and the pins 60 with which they are engaged serve to locate the cylinders 36 positioned on the cylindrical bushings 72 with relative precision on grid 16. Consequently, there is suitably precise location of the edges 40b of the notches in the straps and the portions of the sleeves 36 with which they engage so that welding of the sleeves to the grid at the edges 40b may be achieved. Further, the positioning pegs 76 serve to position the sleeves with which they are engaged relative to the grid 16, in the same manner as the pins 60 and bushings 72.

Figure 7:
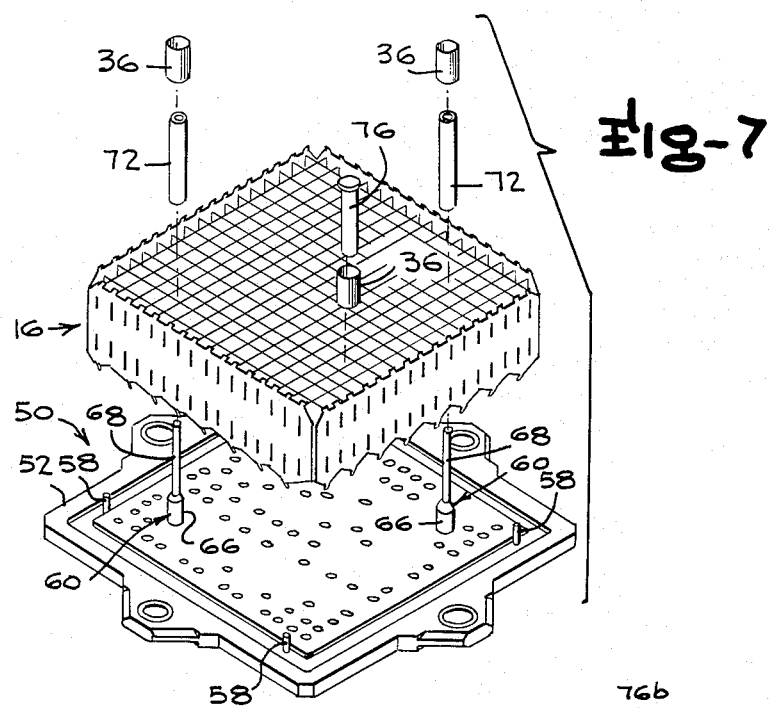
FIG. 7 is a perspective view disclosing the method of assembling the welding fixture, grid and sleeves.
Figure 8:
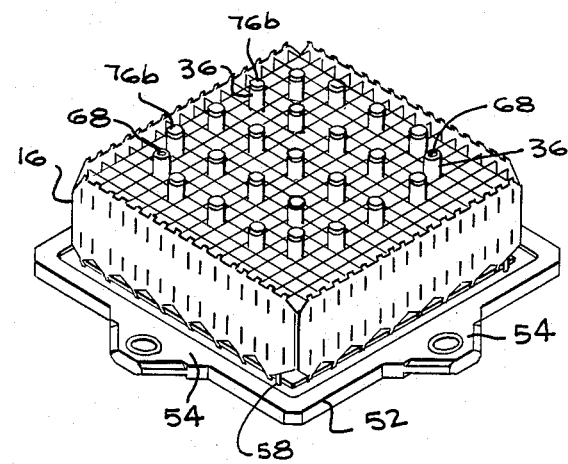
FIG. 8 is a perspective view showing the welding fixture, grid and sleeves in preparation for welding.
Figure 9:
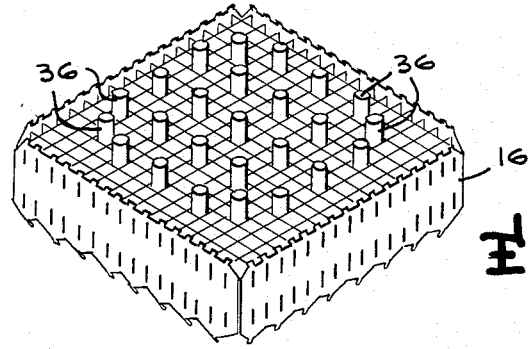
FIG. 9 is a perspective view after the completion of the welding steps, and with the welding fixture removed.

Referring now to FIGS. 7, 8, and 9, there are shown the steps in practicing the method in accordance with the present invention. In FIG. 7, there is shown the grid 16 and the welding fixture 50, including the plate 52 and the positioning pegs 76. On the plate 52 are the abutment members 58, and extending from the plate 52 are the two grid locating pins 60. The grid 16 is lowered, coming into engagement with the upper ends of the abutment members 58, the small diameter portion 68 of the grid locating pins entering into cells of the grid 16. The movement of the grid 16 towards the plate 52 continues until the noted engagement of the lower side of the grid 16 with the upper ends of the abutment member 58, at which time the large diameter portions 66 of the grid locating pins 60 will have entered into the cells, and engaged the four straps forming the cells, as shown in FIG. 6. Thereafter, the two cylindrical bushings 72 are placed on the small diameter portions 68 of the grid locating pins 60, and the sleeves 36 then placed on the cylindrical bushings 72. The sleeves 36 will be seated, in the manner illustrated in FIG. 6, on the grid straps. Additional sleeves 36, as required, will be then associated with the grid 16, with the positioning pegs 72 extending through them and into the cells of the grid. This may be accomplished most readily by first passing the positioning pegs 76 through the sleeves 36, and then inserting the lower ends of the positioning pegs into the selected cells of grid 16. The number of positioning pegs 76 and grids 36 is provided, as required, so that there results the assemblage as shown in FIG. 8. The heads 76b of the positioning pegs 76 will be seen above the ends of the sleeves 36, except for the sleeves adjacent the opposite corners, where there will be seen the ends of the small diameter portions 68 of the grid locating pins 60. There will also be seen in FIG. 8 the plate 52 with the protrusions 54. As thus assembled, each of the sleeves 36 is held, relative to the grid 16, in the position hereinabove noted and the sleeves 36 are then welded to the grid 16. More particularly, a suitable apparatus is utilized to engage the plate 52 and to position it in a plurality of positions so as to enable the sleeves 36 to be welded to the grid 16 by a laser beam. The welding continues until all of the sleeves 36 are satisfactorily welded to the grid 16.

Thereafter, as shown in FIG. 9, the welding fixture 50 is removed, leaving the grid 16 with the desired number of sleeves 36 welded satisfactorily to it in the position as above described. The disassembly of each welding fixture 50 from the assembly of the grid 16 and the sleeves 36 is readily accomplished. The heads 76b of the positioning pegs 76 may be readily grasped, and the positioning pegs withdrawn from the grid 16 and the sleeves 36. The two cylindrical bushings 72 may be withdrawn from their cells, or not. Then the grid 16 with the sleeves 36 welded thereto may be moved away from the plate 52, and thereafter, if the cylindrical bushings 72 have not previously been disassociated from the grid 16, this is done, as by pushing them out of the cells in which they are located.

The separation of welding fixture 50, including both plate 52 and positioning pegs 76, from the assembled grid 16 and sleeves 36 is readily accomplished because there is no binding of the elements which position the sleeves 36 relative to the plate 52. This is because there are only two grid locating pins 60, and these are sufficient to locate the entire grid 16 relative to the plate 52. The positioning pegs 76, not being connected to the plate 52, set up no binding forces between them, grid 16 and the plate 52.

Accordingly, by the herein disclosed apparatus and method, there is achieved precise positioning of the sleeves 36 relative to the grid 16, together with ready removal of the assemblage of the grid 16 and sleeves 36 from the welding fixture.

In considering this invention, it should be remembered that the present disclosure is illustrative only and the scope of the invention should be determined by the appended claims.

We claim:

1. A method for assembling a grid and sleeves for welding comprising:
   providing a grid of intersecting straps forming uniform size square cells with strap edges coplanar on one side of said grid;
   providing a plurality of sleeves for joining to said grid at said one side thereof, said sleeves having an inner diameter substantially equal to the distance between opposing faces of straps forming a cell;
   providing a flat plate comprising positioning means, and having abutment means and spaced locating pins extending from a surface thereof, said pins each having a large diameter portion adjacent said plate for mating with the straps forming a said cell remote from said side of said grid, said pins each having a small diameter portion extending beyond said large diameter portion;
   placing said grid on said locating pins and against said abutment means with each pin extending into a cell; and
   placing said sleeves in engagement with grid straps forming cells of said grid into which said pins extend.

2. The method of claim 1, and further comprising providing a cylindrical bushing for each said locating pin, said bushing having an inner diameter and an outer diameter for matingly engaging said pin small diameter portion and the straps of a said cell, respectively, and placing said bushing in said cell on said pin small diameter portion.

3. The method of claim 2, and further comprising providing said cylinder of sufficient length to extend beyond said coplanar edges of said grid, said placing of said sleeves comprising placing a said sleeve on said bushing and in engagement with the straps forming the said cell.

4. The method of claim 3, and further comprising providing a notch at the said edge of each of the straps forming said cells into which said pins extend, each notch being rectangular, having an edge parallel to a said strap edge and being centrally located on the said strap between adjacent straps, and each notch having additional edges spaced apart, said placing of said sleeve comprising seating said sleeve in the notches of the straps forming a said cell with the edges of each notch substantially in engagement with said sleeve.

5. The method of claim 1 or 3, and further comprising providing cylindrical pegs each having a diameter substantially equal to the inner diameter of said sleeves and to the width of said cells, and causing each of said pegs to extend through a said sleeve and into a said cell.

6. The method of claim 5, and further comprising providing each said peg with a head larger than a said sleeve.

7. The method of claim 1, and further comprising providing a notch at the said edge of each of the straps forming said cells into which said pegs extend, each notch being rectangular, having an edge parallel to a said strap edge and being centrally located on the said strap between adjacent straps, and each notch having additional edges spaced apart, said placing of said sleeve comprising seating said sleeve in the notches of the straps forming a said cell with the edges of each notch substantially in engagement with said sleeve.

8. Welding fixture, for welding sleeves to a grid comprised of perpendicular sets of uniformly spaced, parallel straps defining cells, said welding fixture comprising:
   (a) a generally flat plate having positioning means thereon;
   (b) abutment means extending from a surface of said plate for supporting said grid at a predetermined distance above said surface;
   (c) grid locating means extending from said surface beyond said abutment means for entering into and engaging the straps defining a said cell of said supported grid, said grid locating means consisting of a pair of pins located on, and fixed to, said plate a distance from each other, with each said pin comprising a large diameter portion adjacent said plate for entering into and engaging the straps defining a said cell of said supported grid, and a small diameter portion remote from said plate and having an end adjacent the top of said supported grid; and
   (d) a cylindrical bushing on each said pin matingly engaging said small diameter portion thereof and having an external diameter generally equal to that of said large diameter portion of said pin for engaging the straps of its corresponding pin engaging said cell, wherein a pair of said sleeves each has an outer diameter generally the same as the distance between the surfaces of said straps forming a said cell which are opposite the facing surfaces of said straps defining said cell, wherein each of said straps at each of said pin engaging cells has a rectangular notch in an edge thereof centrally located between its two adjacent said straps, one edge of said notch being spaced from and parallel to the edge of its said strap, the edges of said straps having the notches therein being generally coplanar, and wherein said pair of sleeves each is coaxially disposed on a corresponding said bushing, seated in its corresponding said notches, and engaging the edges of said corresponding notches.

9. The combination of claim 8, wherein another of said sleeves engages associated said straps defining another of said cells, said another sleeve having an inner diameter generally equal to the distance between the facing surfaces of said straps defining a said cell, and said combination further comprising a positioning peg engaging the inner diameter of said another sleeve and the facing surfaces of said another cell, each of said straps at said peg engaging cell having an associated rectangular notch in an edge thereof centrally located between its two adjacent straps, one edge of said associated notch being spaced from and parallel to the edge of its said strap, the edges of said straps having the associated notches therein being generally coplanar, and wherein said another sleeve is seated in its associated said notches and engaging the edges of said associated notches.

10. The combination of claim 9, said peg having a head engaging the end of said another sleeve opposite the end thereof engaging said grid.

* * * * *